(12) United States Patent
Iizuka et al.

(10) Patent No.: US 6,697,068 B2
(45) Date of Patent: Feb. 24, 2004

(54) GAME SCREEN DISPLAY CONTROL METHOD AND CHARACTER MOVEMENT CONTROL METHOD

(75) Inventors: Takashi Iizuka, Tokyo (JP); Tetsu Katano, Tokyo (JP); Yuji Naka, Tokyo (JP); Takuya Matsumoto, Tokyo (JP); Yojiro Ogawa, Tokyo (JP)

(73) Assignee: Sega Corporation, Tokyo (JP)

( * ) Notice: Subject to any disclaimer, the term of this patent is extended or adjusted under 35 U.S.C. 154(b) by 0 days.

(21) Appl. No.: 10/067,311

(22) Filed: Feb. 7, 2002

(65) Prior Publication Data

US 2002/0075264 A1 Jun. 20, 2002

Related U.S. Application Data

(62) Division of application No. 09/377,677, filed on Aug. 19, 1999.

(30) Foreign Application Priority Data

Aug. 21, 1998 (JP) ............................................ 10-235635
Nov. 19, 1998 (JP) ............................................ 10-329819

(51) Int. Cl.$^7$ ............................................ G06T 15/00
(52) U.S. Cl. ....................................................... 345/427
(58) Field of Search ................................ 345/427, 629, 345/632, 633, 638, 640, 473, 474, 706, 479, 751, 757, 758, 759, 957, 959, 960

(56) References Cited

U.S. PATENT DOCUMENTS 5,982,372 A * 11/1999 Brush, II et al. ............ 345/418

* cited by examiner

*Primary Examiner*—Almis R. Jankus
(74) *Attorney, Agent, or Firm*—Keating & Bennett, LLP

(57) ABSTRACT

Provided is a game screen display controlling method comprising the steps of displaying a first game screen obtained from a first projection of a virtual 3-D space; comparing the priority of the first projection with the priority of a second projection correlated with a predetermined area when there is a predetermined positional relationship between a character who moves in the virtual 3-D space and the predetermined area set within the virtual 3-D space; and displaying a second game screen obtained from the second projection of the virtual 3-D space when the priority of the second projection is higher than the priority of the first projection. Thereby, the invention allows game pictures for effectively rendering the virtual 3-D space to be presented corresponding to the situation of the game.

15 Claims, 18 Drawing Sheets

| IDENTIFICATION NO. | AREA SHAPE/ POSITION | PRIORITY | CAMERA ANGLE/POSITION |
|---|---|---|---|
| 001 | plane | 03 | TRACKING |
| 002 | rectangular | Area | DESIGNATING DIRECTION |
| 003 | rectangular | 01 | DESIGNATING ONE POINT |
| ⋮ | ⋮ | ⋮ | ⋮ |
| 012 | sphere | Area | ADJUSTING DISTANCE |
| 013 | sphere | Event | EVENT |
| ⋮ | ⋮ | ⋮ | ⋮ |
| 026 | plane | 03 | TRACKING |
| 027 | plane | Area | MOVING PATH |
| 028 | rectangular | 03 | FIXING COORDINATE |
| 029 | rectangular | 02 | TRACKING |
| ⋮ | ⋮ | ⋮ | ⋮ |

FIG.8
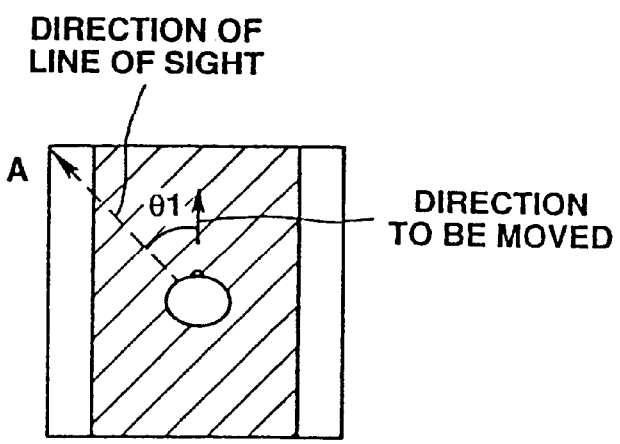
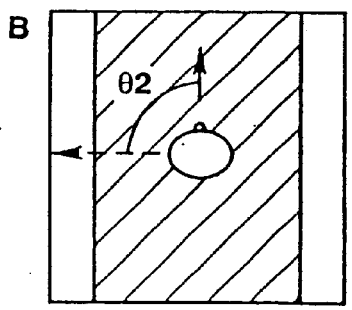
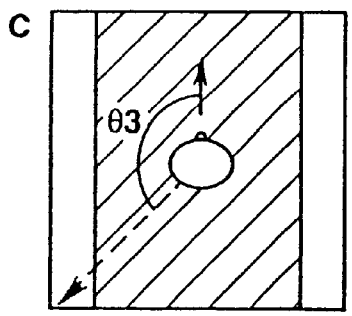

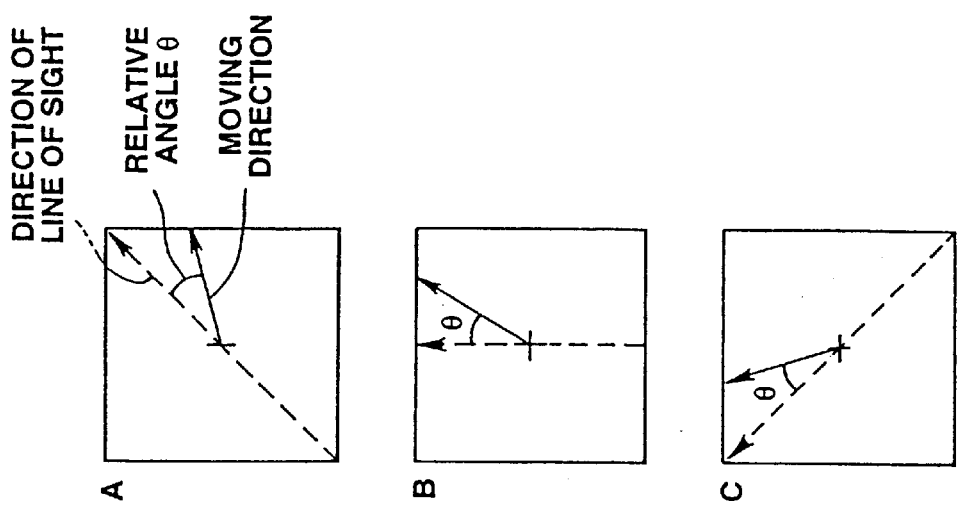
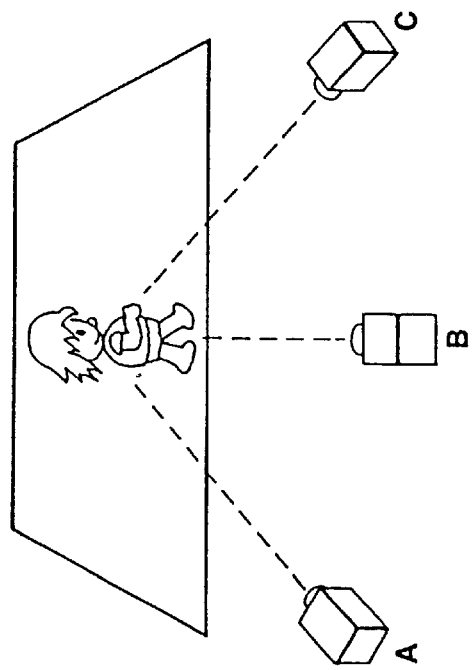

GAME SCREEN DISPLAY CONTROL METHOD AND CHARACTER MOVEMENT CONTROL METHOD

This application is a Divisional of U.S. patent application Ser. No. 09/377,677 filed Aug. 19, 1999, currently pending.

BACKGROUND OF THE INVENTION

1. Field of the Invention

The present invention relates to user interface technology of a game machine for realizing interactive games.

2. Description of the Related Art

In a game machine realizing so-called action type games and the like, a leading character (player character) within pictures of a game displayed on a display screen is controlled and the story of the game progresses in correspondence with control signals input via an input device (controller pad) controlled by a player.

With the recent improvement of performance of hardware in particular, the stage effect of such game is enhanced further by presenting game pictures in 3-D graphics which the player character acts within a virtual 3-D space.

Based on 3-D data rendering the object, the 3-D graphics renders an object in three dimensions by calculating the spatial positional relationship of the object existing in the direction of line of sight from the view point position (also referred to as "the projection center position) in the virtual 3-D space and by implementing image processing such as a rendering processing. That is, games utilizing the 3-D graphics present the game pictures rendering the virtual 3-D space by rendering the player character and other objects seen from the view point position in three dimensions and by moving the view point and the line of sight corresponding to the control made by the player or to scenes of the game. The picture of the game seen from such view point position is also called a camera angle by likening with an image taken by a camera.

An interest in such action type game or the like is often swayed by the pictures of the game rendered on the display in addition to the story of the game. Therefore, the type of game pictures to be presented to a player is a very important factor in producing a game (game program).

However, conventional games have presented game pictures rendering the virtual 3-D space only from a specific camera angle and could present no game picture seen from the optimum camera angle corresponding to the situation of the game.

For instance, there have been presented game pictures as if they are taken while continually tracking the character by a virtual camera disposed at the upper rear position of the character throughout the story of the game.

However, an enemy character approaching to the leading character from the back or an item disposed on the back could not be fully rendered in such game pictures from the specific camera angle, so the behavior of the enemy character had to be restricted on the game program so as not to attack from the back.

Further, when the character enters a narrow cave for example, the camera angle from the upper rear position theretofore is switched to the low angle seen from the position of the line of sight of the character.

However, the camera angle is only switched to a predetermined one when a specific scene or stage appears in such game and is not switched by judging the optimum angle corresponding to the situation of the game which changes in real-time.

One of the factors for increasing the interest in the game is to provide a game picture that enhances the stage effect of the game as described above.

However, conventional games provided only the game picture rendering the virtual 3-D space from the specific camera angle and are not able to select the optimum camera angle corresponding to the situation of the game or to provide a game picture of that camera angle.

Accordingly, it is an object of the invention to present pictures of a game for rendering a virtual 3-D space effectively corresponding to the situation of the game.

Further, there is a game which is capable of moving the character in a different direction from a specific direction within a virtual 3-D space while developing the story of the game by causing the character to advance in a specific direction.

However, the player looses a so-called sense of direction by loosing the direction in which the character is heading at such time when the direction in which the character is to head in the story of the game deviates from the present heading direction with the camera angle from the position of the light of sight of the character or from the upper rear position. Therefore, desired is a presentation of a game picture so as to indicate the direction in which the character is to head.

Another object of the invention is to present a game picture in which the player controlling the character within the virtual 3-D space rendered on the display will not loose the sense of direction within the virtual 3-D space.

Further, while the character moves in a direction instructed by a directional key of an input device, there is a case when the moving direction of the character in the game picture deviates from the instructed direction input via the input device when the character moves within the virtual 3-D space. For instance, when the path where the character goes along is looped, the character advances in the direction opposite from the direction in which the character is to move forward in game pictures on the path of the looped path even if the player manipulates the directional key in the forward direction (toward the far back of the game picture).

When the player switches the instructing direction of the directional key in accordance with the moving direction of the character on the game picture in such a case, the manipulation becomes very complicated and the player is confused.

Still an other object of the invention is to provide a game machine which simplifies the input manipulation of the input device by the player for moving the character within the virtual 3-D space rendered on the display.

SUMMARY OF THE INVENTION

The inventive game screen display controlling method comprises the steps of displaying a first game screen obtained from a first projection of a virtual 3-D space; comparing the priority of the first projection with the priority of a second projection correlated with a predetermined area when there is a predetermined positional relationship between a character (player character) who moves in the virtual 3-D space and the predetermined area set within the virtual 3-D space; and displaying a second game screen obtained from the second projection of the virtual 3-D space when the priority of the second projection is higher than the priority of the first projection.

Here, "projection" shall mean a view of the virtual 3-D space seen through a virtual camera and is given by various parameters such as the view point position, direction of line of sight and visual range (visual angle) of the virtual camera.

The predetermined area may be a plane set vertically to a plane of the field where the player character moves, a region of a predetermined shape on the plane of the field, a polygon or a sphere for example regardless of whether it is plane or 3-D.

A "predetermined positional relationship" shall mean the positional relationship when the player character touches the predetermined area or when the player character stays within the predetermined area.

The invention pertains also to the control of movement of the character in which an input direction of an input device with respect to a direction of visual recognition within the virtual 3-D space is correlated with the moving direction of the character within the virtual 3-D space and is characterized in that the moving direction of the character is decided based on predetermined path information correlated with a predetermined section when the player character moving in the virtual 3-D space stays within the predetermined section set in the virtual 3-D space.

Path information is data of a plurality of points to which position coordinates and directional information within the virtual 3-D space are given. According to the invention, point data is specified out of the path information based on the position coordinates of the character and the moving direction is decided based on the directional information given to the specified point data.

The invention described above also holds as a program for causing the game machine to realize the predetermined functions. The recording medium here includes a memory such as a RAM and a ROM besides a hard disk (HD), a DVD-ROM, a flexible disk (FD) and a CD-ROM for example. The computer includes a so-called microcomputer and, the like in which a so-called central processing unit such as a CPU and MPU implements predetermined processing by interpreting programs.

The invention of a product may be grasped as the invention of a method and vice versa.

The specific nature of the invention, as well as other objects, uses and advantages thereof, will clearly appear from the following description and from the accompanying drawings.

BRIEF DESCRIPTION OF THE DRAWINGS

FIGS. 8A through 8C show the partial regions shown in FIG. 7;

FIG. 9A shows another example when an input direction is changed with respect to the direction of line of sight and FIG. 9B explains the relationship between the direction of line of sight and the moving direction;

DESCRIPTION OF THE PREFERRED EMBODIMENTS

Preferred embodiments of the invention will be explained below with reference to the drawings.

Embodiments of the invention will be explained with respect to an action type game (game name: SONIC ADVENTURE) in which a player character controlled by a player fights repeatedly against numerous enemy characters while advancing courses set in a virtual 3-D space.

[First Embodiment]

Figure 1:
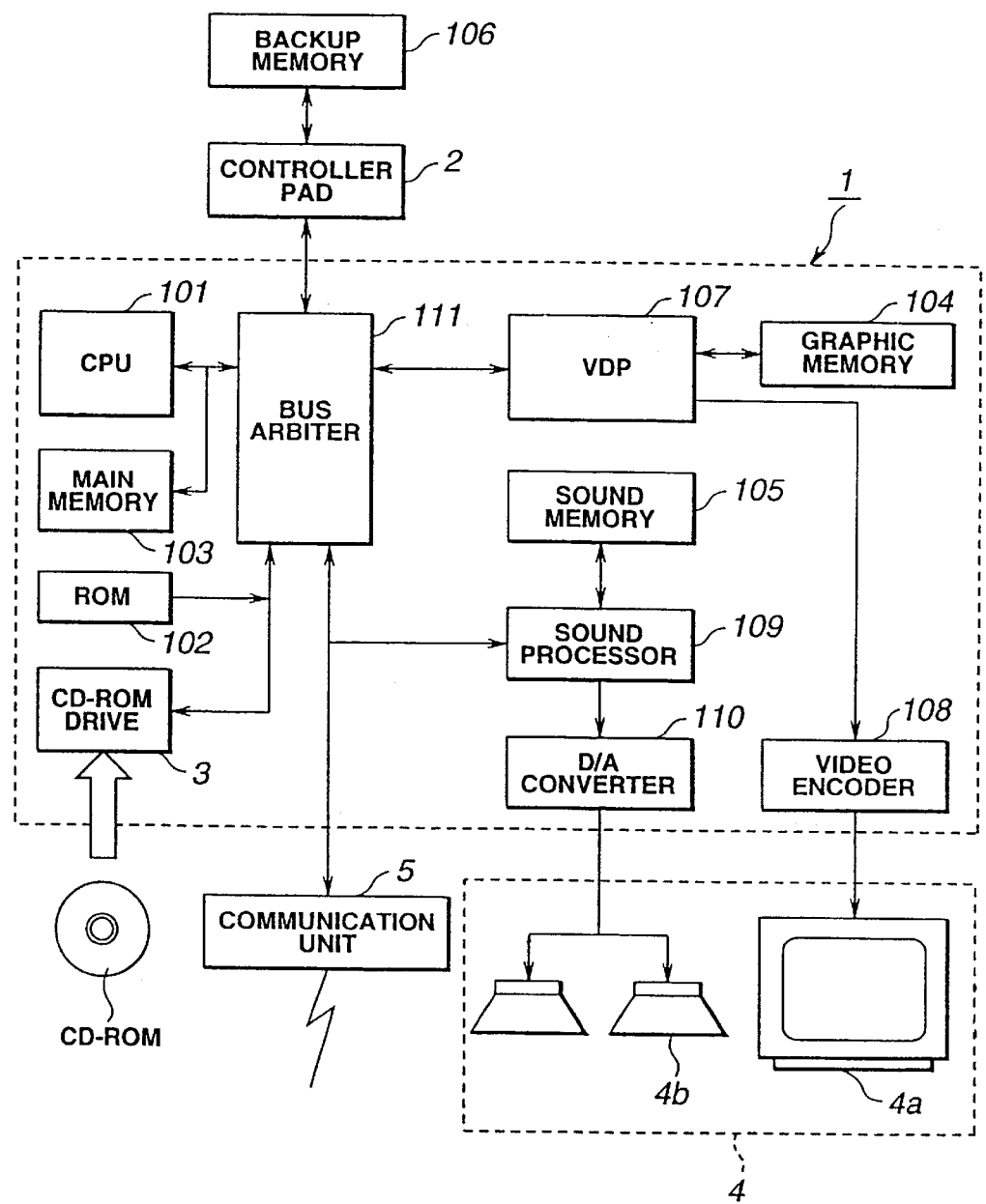
FIG. 1 is a block diagram showing the structure of a game machine of the invention.

FIG. 1 is a block diagram showing the structure of a game machine of the invention. In FIG. 1, the inventive game machine comprises a control unit 1 composed centering on a CPU 101 and others, an input device 2 through which a user inputs control signals to the control unit, an external storage unit 3 for storing an operating system (hereinafter referred to as "OS") and an application program (game program) and for inputting such program to the control unit as necessary, and an output device 4 comprising a display unit 4a, a speaker 4b and the like for providing images and sounds to the user. It is also provided with a communication unit 5 for transmission/reception of data with another computer or game machine via a telephone line or the like. It is noted that the external storage unit 3 is not limited to a CD-ROM or the like shown in the figure and may be a recording medium to which data can be written from the control unit 1 and which can hold the data.

When power is turned on to start the game, a boot program loader not shown loads a boot program (also called as an initial program) stored in a ROM 102 to the CPU 101 and the CPU 101 executes the boot program. In accordance with the boot program, the CPU 101 loads the whole or necessary part of the OS stored in the CD-ROM and the like to a main memory 103 to execute it.

The CPU 101 also loads the whole or necessary part of the application program (hereinafter also referred to simply as "program") stored in a CD-ROM or the like to the main memory 103 and loads rendering data or image data stored in the CD-ROM or the like to a graphic memory 104 as well as sound data to a sound memory 105 as necessary under the control of the OS.

Under the control of the OS, the CPU 101 executes the application program stored in the main memory 103. Data produced along the execution of the application program is written to the main memory 103 or to a backup memory 106 as necessary for reference. The backup memory 106 stores the data to hold the state of the game theretofore even if the power source is shut off as the game is interrupted for example.

It is noted that while the present embodiment is arranged so as to provide the OS and the application program from the CD-ROM, it may be arranged so as to supply them from a ROM or another computer via a network.

A VDP (video display processor) 107 reads rendering data necessary for displaying images stored in the graphic memory 104 and generates image data by implementing various information processing (image processing) based on commands and data from the CPU 101 as the application program is executed. The various image processing includes texture mapping, light source processing, display priority processing and the like. The VDP 107 outputs the generated image data to an encoder 108 for display on the display unit 4a. It is also possible to arrange such that this generated image data is written to a frame buffer memory and the like and is read from the frame buffer memory at a predetermined timing.

A sound processor 109 reads sound data stored in the sound memory 105 to implement various information processing (sound processing) based on the commands and data from the CPU 101 as the application program is executed. The various sound processing includes effect processing, mixing and others. The sound data to which the various sound processing has been implemented is converted to analog data by a D/A converter 110 to be output from a speaker.

A bus arbiter 111 controls the respective units connected via data transmission paths (bus and others). For instance, the bus arbiter 111 decides the priority among the respective units to select a unit occupying the bus and allocates a bus occupied time to a unit occupying the bus.

It is noted that the game machine of the present embodiment is assumed to contain a computer in which a so-called central processing unit such as a CPU and MPU implements the processing by interpreting the program. Included in the recording media are memories such as a RAM and a ROM besides a flexible disk (FD) a CD-ROM, a DVD and others.

The inventive game machine constructed as described above realizes predetermined functions of the invention as the CPU executes the program read from the external recording medium such as the CD-ROM. The game machine of the present embodiment will be explained below by utilizing a functional block diagram which shows the game machine functionally and which is composed of function realizing means.

Figure 2:
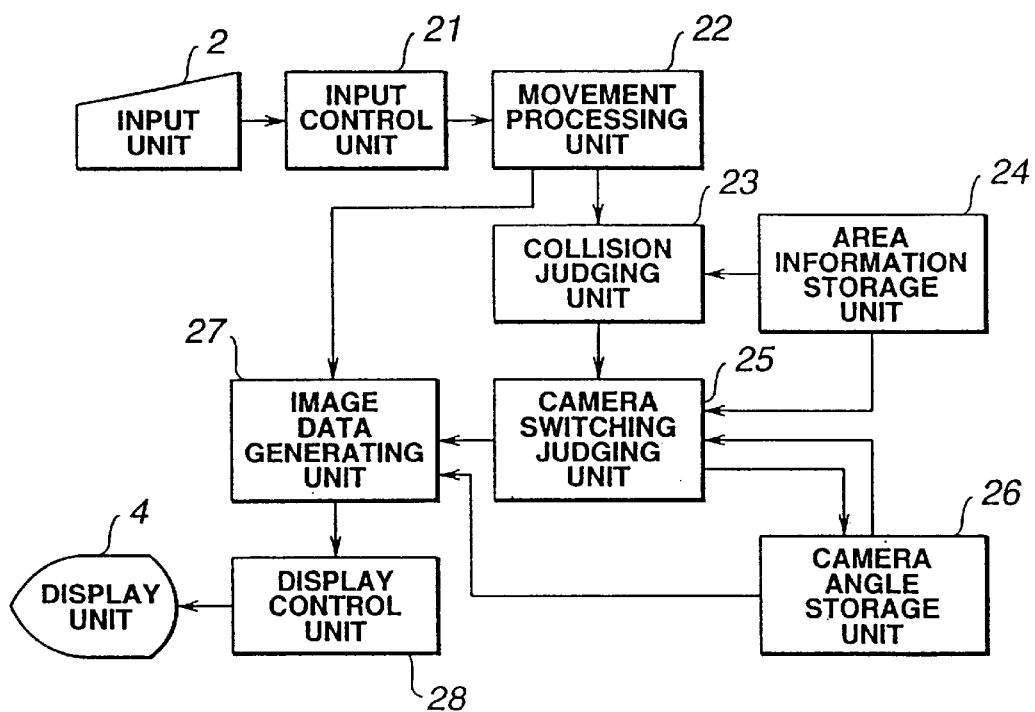
FIG. 2 is a block diagram functionally showing the game machine of a first embodiment.

FIG. 2 is a functional block diagram showing the game machine of the present embodiment. As shown in the figure, the input unit 2 is used by the player to control the game variously while watching the game screen displayed on the display unit 4. The input unit 2 generates control signals corresponding to the control made by the player and outputs the control signal to an input control unit 21. In the present embodiment, the player can specify the direction in which the player wants to move the player character within the virtual 3-D space with the input unit 2.

The input control unit 21 controls in accordance with the control signal sent from the input unit 2. That is, when the control signal instructing to move the player character is sent from the input unit 2, the input control unit 21 sends that control signal to a movement processing unit 22. The movement processing unit 22 calculates the coordinates of the position of the player character within the virtual-3D space based on the sent control signal. The movement processing unit 22 sends calculated coordinates of the position of the player character to a collision judging unit 23.

The collision judging unit 23 judges whether or not the player character has touched a camera switching judging area (hereinafter referred to as "area") set in advance within the virtual 3-D space as the player character moves and sends the result of judgment to a camera switching judging unit 25. The area is set at the position where the player character within the virtual 3-D space can move as shown in a broken line of FIG. 3. However, this area is not normally displayed in the game picture unless it is related to the story of the game.

An area information storage unit 24 holds the position, shape and others of the area set within the virtual 3-D space as area information.

Figures 4A, 4B:
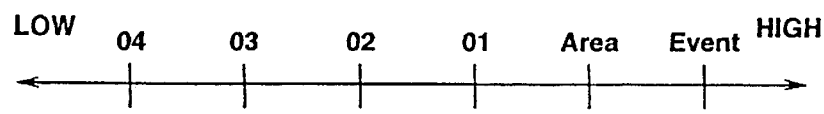
FIGS. 4A and 4B show one example of area information stored in an area information storage unit.

FIGS. 4A and 4B show one example of the area information stored in the area information storage unit 24. As shown in FIG. 4A, the area information is connected with identification Nos. for identifying individual areas, the shape and position of the area (not shown) within the virtual 3-D space, the priority of the respective areas, camera angle and the position (not shown) thereof.

The relationship between the respective priorities is given as shown in FIG. 4B. It is noted that among the priorities, "Area" indicates that the priority is given to the area when the player character stays within that area and "Event" indicates that the priority is given to the area when the area is designated forcibly by the program.

While the camera angle means the view point position (camera position) within the virtual 3-D space and its line of sight (camera line of sight), it will be used in a wide meaning including camera work (camera mode) and an angle of the view field regarding how the position of view point (camera position) and the line of sight (camera line of sight) are moved unless specified otherwise. The camera angle include, the following examples.

Tracking: To project a virtual 3-D space from the position apart from the player character by a predetermined distance so as to continually track the player character.

Designating Direction: To continually project a fixed direction by designating a line of gaze of a virtual camera.

Designating One Point: To continually project one point by designating a line of gaze of the virtual camera. It allows a look-up virtual camera, a look-down virtual camera and the like to be specified.

Adjusting Distance: To designate a distance between the player character and the virtual camera. It allows zoom-in and zoom-out to be designated, the player character to be enlarged apparently and the surrounding topography to be viewed.

Moving Path: The virtual camera may be moved as designated by designating a route where the virtual camera passes. It allows game pictures in which a player moves through a complicated topography to be provided for example.

Fixing Coordinates: To continually project the direction of the player character while fixing the position coordinates of the virtual camera.

Event: Customized corresponding to various situations.

By preparing a plurality of such camera angles, it becomes possible to present special effects of presenting powerful actions at low angles and of rendering a specific character effectively by zooming in for example, in addition to the purpose of indicating the direction in which the player character is to move in the story of the game.

Returning to FIG. 2, when the collision judging unit 23 judges that the player character touched a certain area, the camera switching judging unit 25 compares the priority of the camera angle set for that area with that of the present camera angle stored in the camera angle storage unit 26 to judge which priority is higher and sends its result to the image data generating unit 27.

The image data generating unit 27 generates image data for rendering a virtual 3-D space from the present camera angle and sends the image data to the display control unit 28. The display control unit 28 displays the sent image data on the display unit 4 as game pictures.

Figure 5:
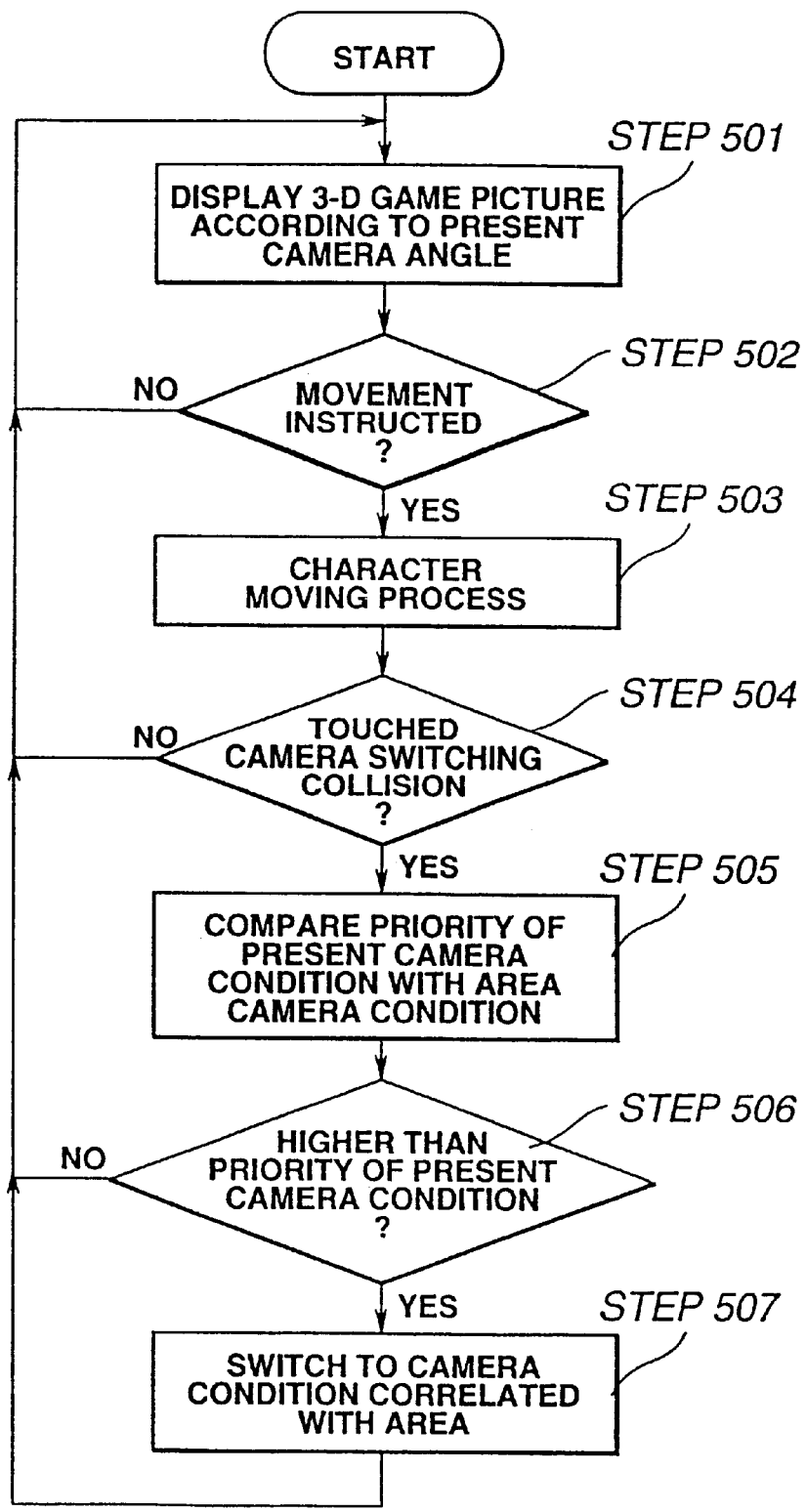
FIG. 5 is a flowchart for explaining the operation of the game machine of the first embodiment.

FIG. 5 is a flowchart for explaining the operation of the game machine of the present embodiment. The game machine displays a 3-D game picture on the display unit 4 in accordance with the present camera angle in Step 501 in the figure. Then, the player implements input manipulations (manipulation of movement) through the input unit 2 at hand while watching the game picture displayed on the display unit 4. The input control unit 21 judges whether or not the input manipulation of the player is a command to move the player character in Step 502. When it is judged to be the command to move the character, the movement processing unit 22 calculates position coordinates of the player character within the virtual 3-D space.

Next, the collision judging unit 23 judges whether or not the player character touches an area set within the virtual 3-D space by the movement in Step 504. When it is judged that the player character has touched the area, the camera switching judging unit 25 compares the priority of the present camera angle with that of the camera angle corresponding to that area to judge which priority is higher in Steps 505 and 506. When the camera switching judging unit 25 judges that the priority of the camera angle corresponding to that area is higher than that of the present camera angle, it switches the camera angle to that of the area as a present camera angle in Step 507. Thereby, a game picture whose camera angle has been switched is displayed on the display unit 4.

It is noted that when it is judged that the priority of the present camera angle is higher in Step 506, the camera angle is not switched and the game picture is displayed with the present camera angle.

As described above, whether the camera angle should be switched or not is judged when the player character touches the camera switching judging area while moving within the virtual 3-D space and the camera angle is switched when the predetermined condition is fulfilled in the game machine of the present embodiment.

Figure 3A:
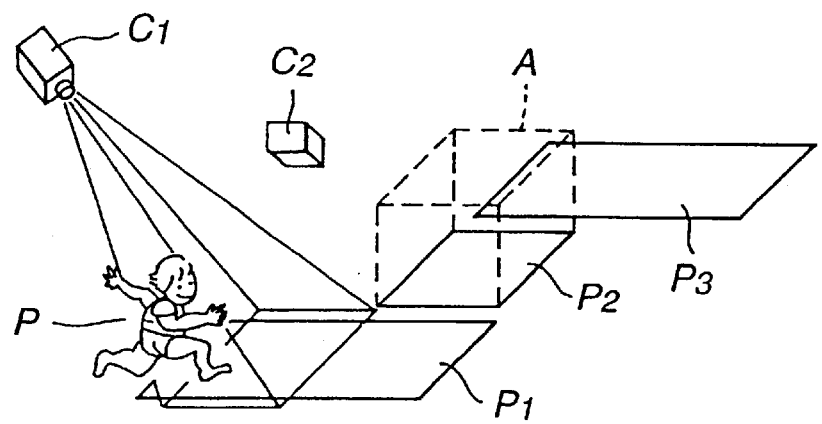
FIGS. 3A and 3B show one example in switching cameras.
Figure 3B:
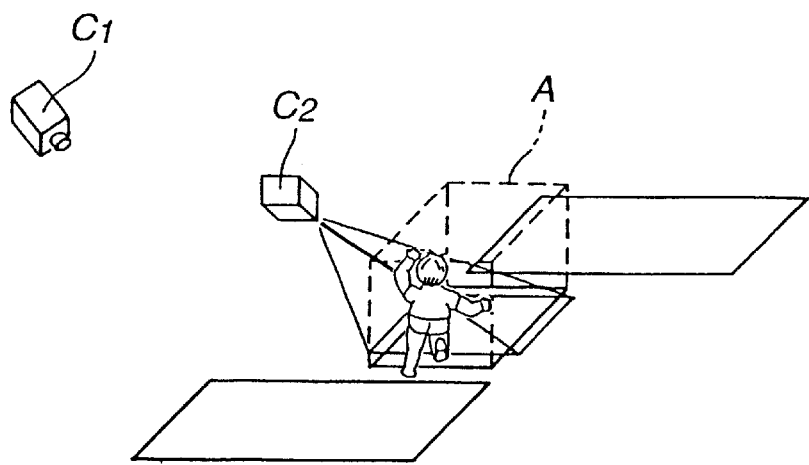

FIGS. 3A and 3B are drawings for explaining one example in switching the cameras. Assume that a player character P is moving in the direction of the arrow along paths P1, P2 and P3 set within a virtual 3-D space as shown in FIG. 3A and the virtual 3-D space projected from a camera angle of a virtual camera C1 is displayed as a game picture. When the player controls the player character P so as to change the direction to the path P2 at the edge of the path P1, the player character P touches an area A and it is judged whether or not the camera angle should be switched. When the priority of a virtual camera C2 is higher than that of the virtual camera C1 for example, the camera angle is switched to that of the virtual camera C2 and a virtual 3-D space projected by the virtual camera C2 is displayed as a game picture.

Figure 6:
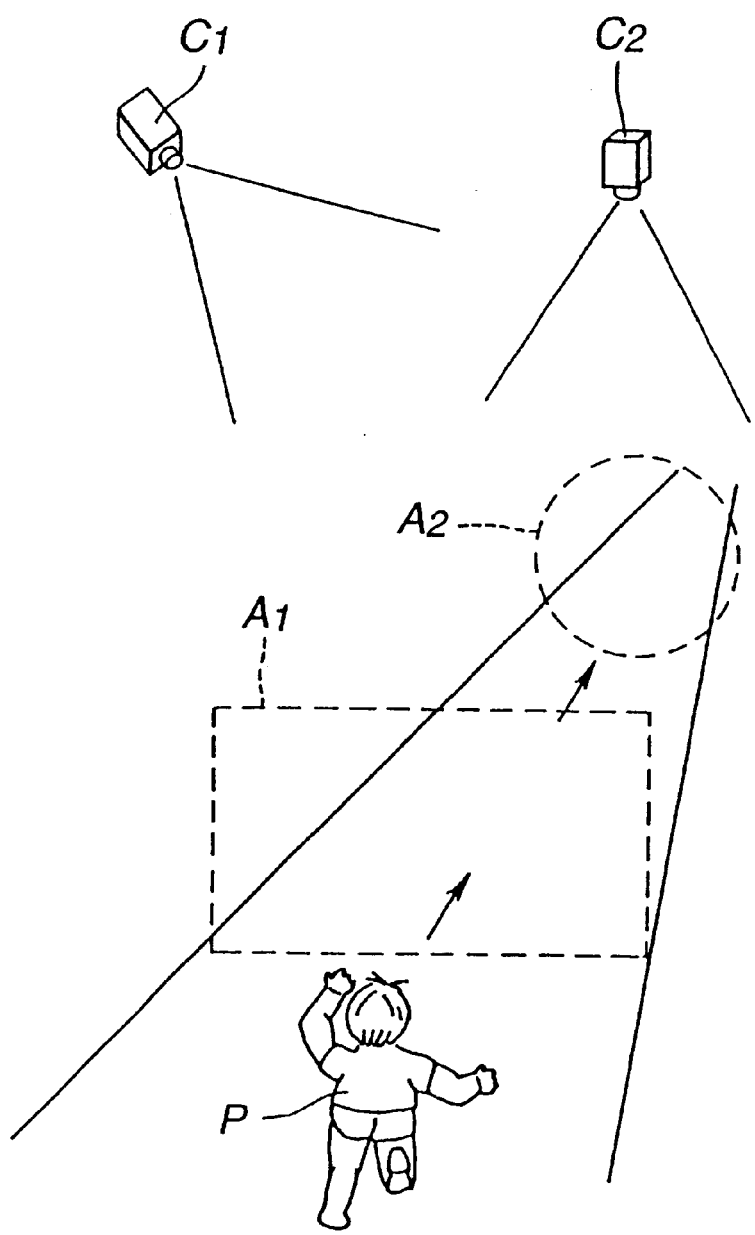
FIG. 6 shows another example in switching cameras.

FIG. 6 shows another example in switching the cameras. It shows a game screen when a path of the player character P extending in the depth direction in the virtual 3-D space is seen from a virtual camera (C0, not shown) located at the upper rear position of the player character P. Under this situation of the game, a planar area A1 and a globular area A2 are set in front of the player character. The virtual camera C1 is correlated with the area A1 and the virtual camera V2 is correlated with the area A2, respectively. When the player character P touches the area A1 under the control of the player, the priority of the present virtual camera C0 is compared with that of the virtual camera C1. Then, when the priority of the virtual camera C1 of the area A1 is higher than the other, the camera angle is switched to that of the virtual camera C1. In the same manner, when the player character P touches the globular area A2, it is judged whether or not the camera angle should be switched and a game picture from the, virtual camera having the higher priority is displayed.

Thus, it becomes possible to provide a game picture as if the virtual 3-D space is projected (taken) from the optimum position corresponding to the situation of the game. It is also possible to provide highly optimum game pictures because the present embodiment is arranged so as to compare the priorities of the camera angles in particular. It is also possible to provide interesting game pictures because the priority of the present camera angle is given depending on the moving pattern of the player character and the camera angles are switched dynamically.

[Second Embodiment]

A directional key of the input device 2 used in the game machine is constructed such that an input direction is decided by the direction in which the key is tilted and the moving speed and acceleration are decided by the tilting stroke. The moving direction of the player character within a game picture rendering a virtual 3-D space is decided by indicating the input direction with respect to the direction of line of sight in the virtual 3-D space.

Accordingly, when the direction of line of sight (camera angle) changes, the moving direction of the player character changes even if the input direction of the directional key is not changed.

Figure 7:
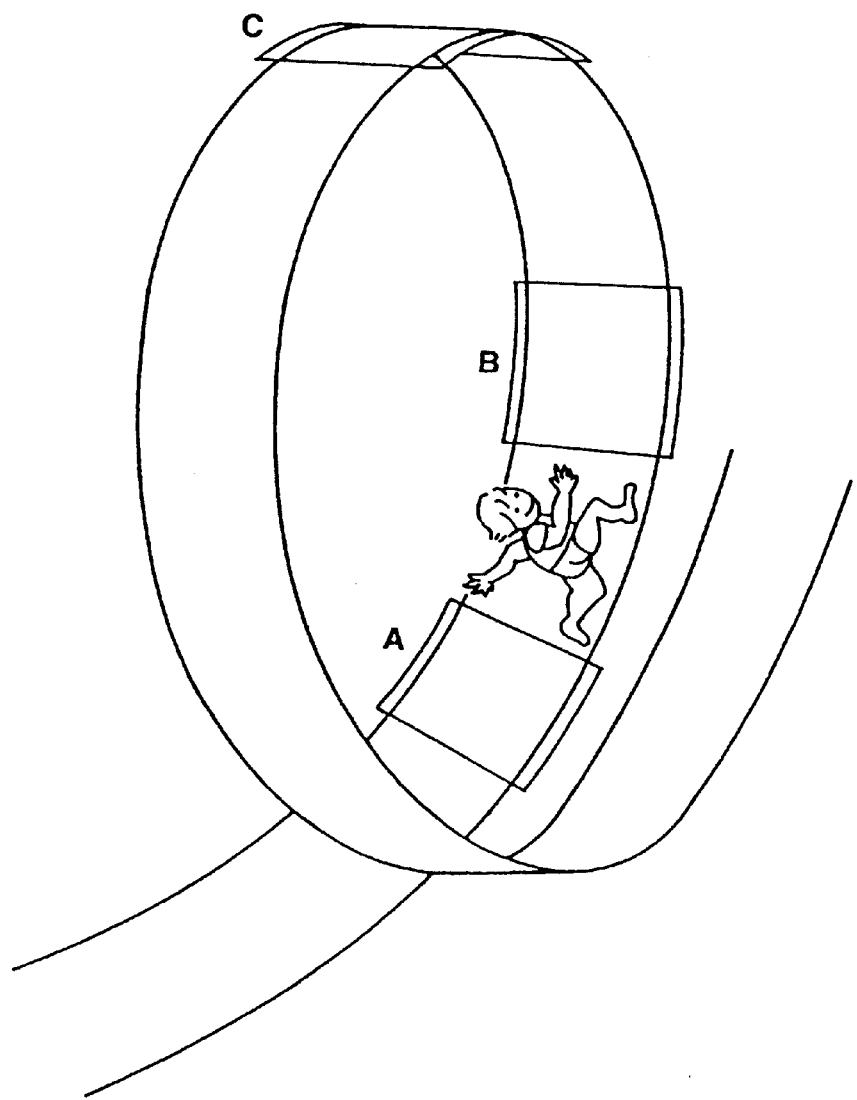
FIG. 7 shows one example when an input direction is changed with respect to the direction of line of sight.

When the player character passes through a course formed into a loop as shown in FIG. 7 for example, the directions of line of sight (directions of broken line) at the respective points of time A, B and c change as shown in FIG. 8, so the input direction must be changed with respect to the direction of line of sight in order to fix the direction in which the player character is to move.

Further, when the input direction of the directional key is fixed, the direction in which the player character is to move changes in a game picture presented while moving the virtual cameras (line of sight) as shown in FIG. 9.

The present embodiment is characterized in that in a game controlling method in which the input direction with respect to the direction of line of sight is set as the moving direction of the player character, the player character is controlled so as to move in a specific direction regardless of the change of the input direction with respect to the direction of line of sight when the player character stays within a specific area.

Figure 10:
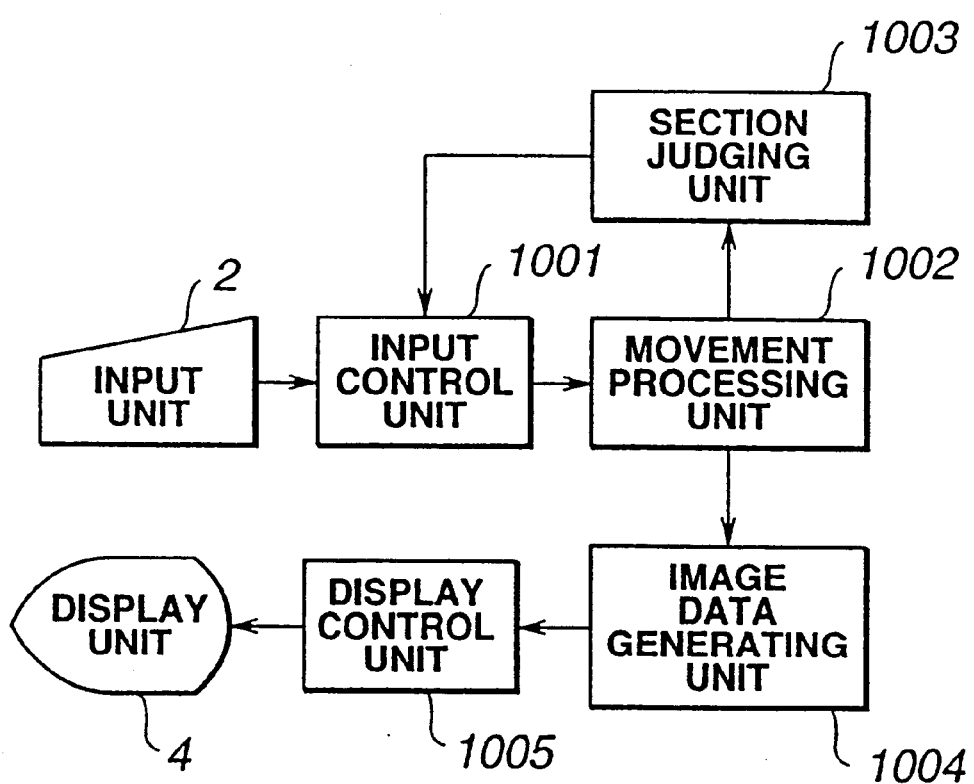
FIG. 10 is a block diagram functionally showing a game machine of a second embodiment.

FIG. 10 is a functional block diagram showing the game machine of the present embodiment.

The input unit 2 (corresponds to the input device in FIG. 1) has a directional key not shown. When the directional key is tilted by the player, the input unit 2 sends a control signal corresponding to the tilting direction (hereinafter referred to as "input direction") and to a tilting stroke (hereinafter referred to as "stroke") to an input control unit 1001.

The input control unit 1001 controls in correspondence with the control signal sent from the input unit 2. That is, the input control unit 1001 sends the input direction and its stroke sent from the input unit 2 to a movement processing unit 1002 according to the result of judgment of a area judging unit 1003 described later. The movement processing unit 1002 calculates position coordinates of the player character in the virtual 3-D space based on the indicated moving direction and the stroke. The area judging unit 1003 judges whether or not the player character is staying within the specific area. The specific area is a unit formed into the loop in the present embodiment. When the area judging unit 1003 judges that the player character is staying within the specific area, the movement processing unit 1002 calculates the position coordinates of the player character based on not the input direction indicated by the directional key but on a movement instructing direction generated inside in place of the input direction. An image data generating unit 1004 generates image data rendering the virtual 3-D space from the present camera angle based on the position coordinates of the player character obtained by the movement processing unit 1002 and sends the image data to a display control unit 1005. The display control unit 1005 displays the sent image data on the display unit 4 as a game picture.

Figure 11:
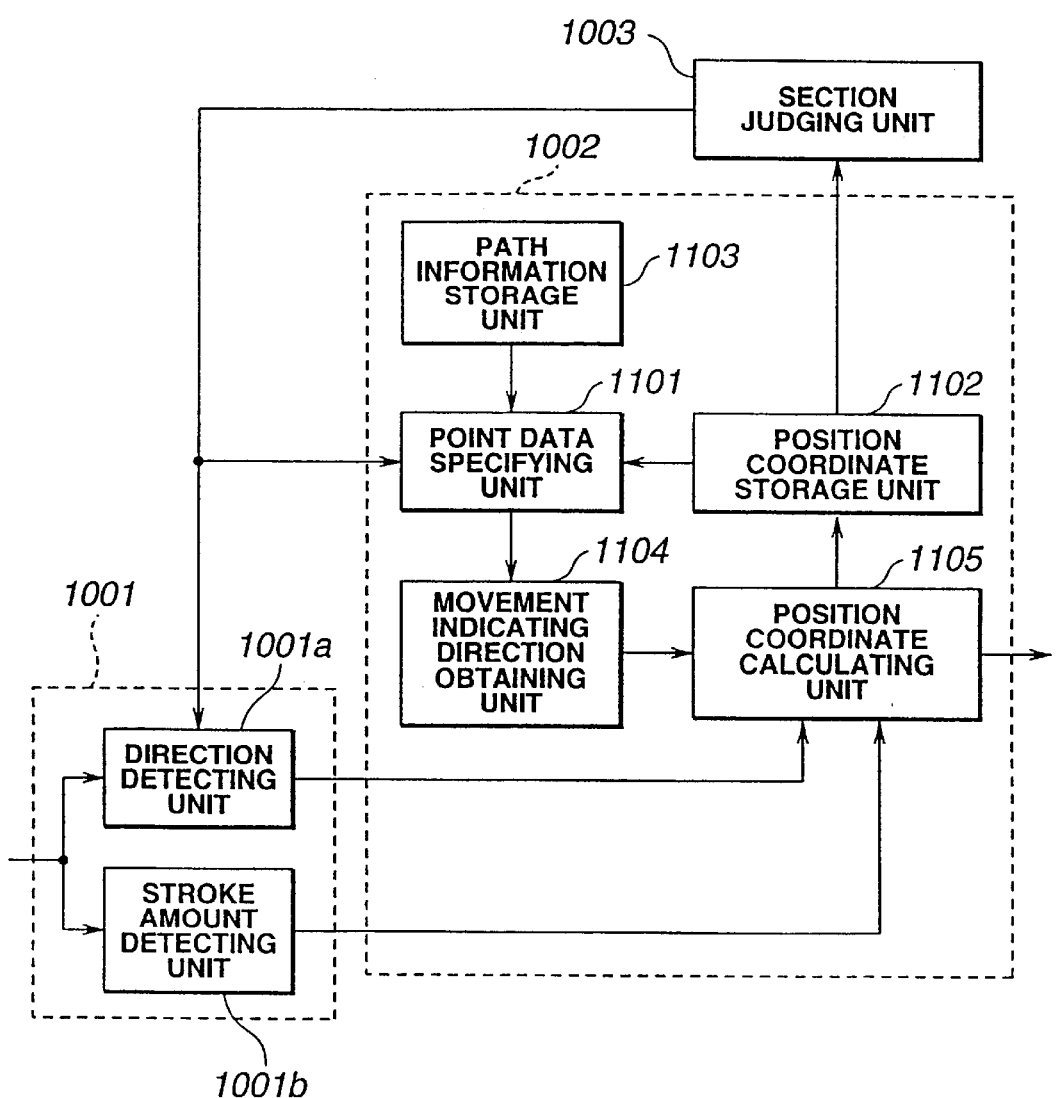
FIG. 11 is a block diagram showing a movement processing unit in detail.
Figure 12A:
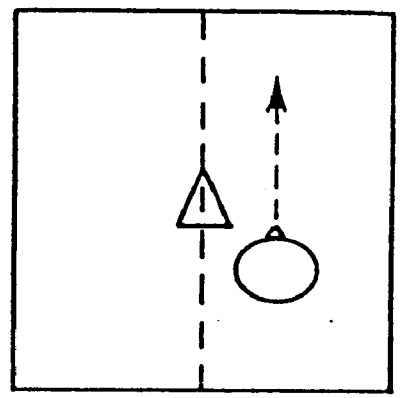
FIGS. 12A through 12C are diagrams showing an example in obtaining a movement instructing direction.

FIG. 11 is a functional block diagram showing the movement processing unit in detail. When the area judging unit 1003 judges that the player character is not staying within a specific area, a position coordinate calculating unit 1101 calculates the position coordinates of the player character based on the input direction from a direction detecting unit 1001a and the stroke from a stroke detecting unit 100b. Meanwhile, when it is judged that the player character is staying within a specific area, a standard point specifying unit 1102 specifies point (nearest point) information located nearest to the player character among information of range of points stored in a path information storage unit 1104 and sends it to a movement instructing direction obtaining unit 1105. The movement instructing direction obtaining unit 1105 obtains (decides) a movement instructing direction (indicated by a triangular arrow in the figure) given by the sent point data as shown in FIG. 12A and sends it to the position coordinate calculating unit 1001. The position coordinate calculating unit 1001 calculates the position coordinates of the player character based on the movement instructing direction sent from the movement instructing direction obtaining unit 1105 and the stroke sent from the stroke detecting unit 1001b. That is, it calculates the position coordinates of the player character assuming that the movement instructing direction generated inside as the input direction from the input unit 2.

Figure 13:
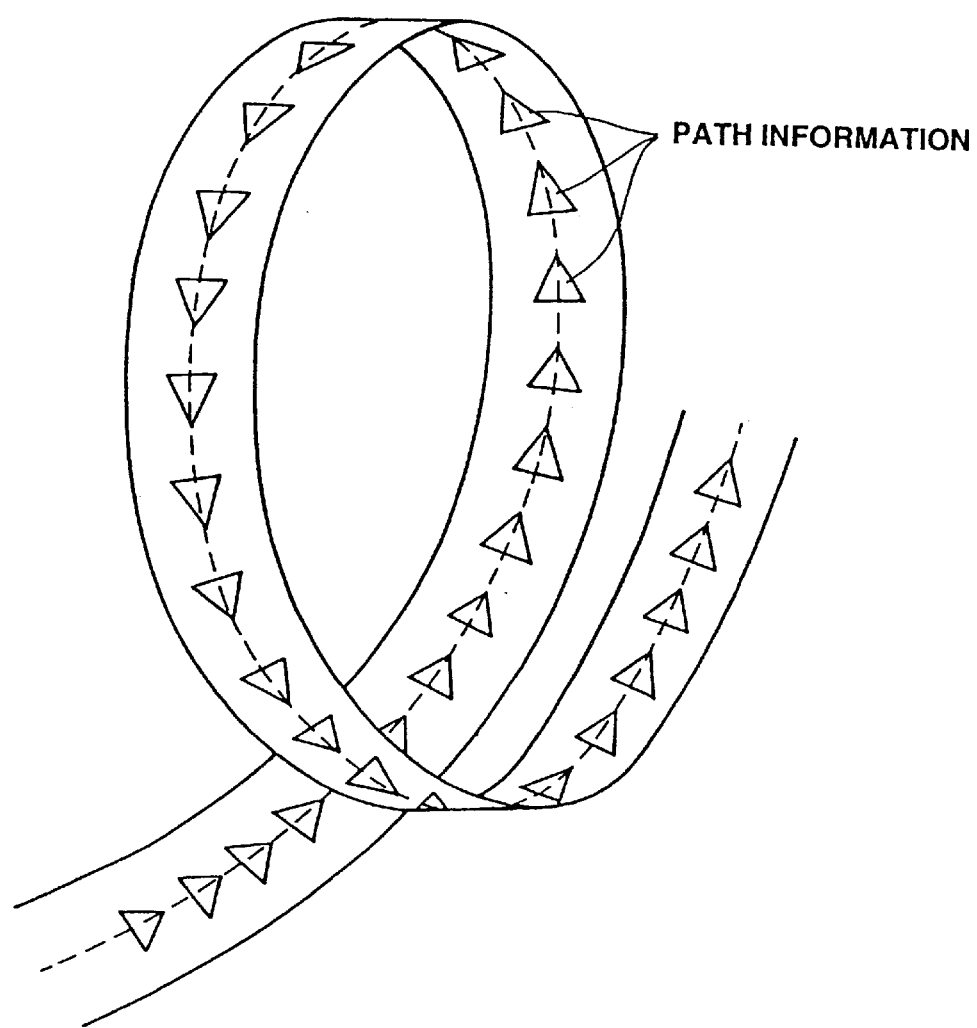
FIG. 13 is a diagram explaining path information.

FIG. 13 is a diagram explaining path information. As shown in the figure, path information is the position coordinate and directional vector (movement instructing direction) given to respective points of the range of points disposed within the virtual 3-D space. Path information is given to a specific area within a course set within the virtual 3-D space.

Figure 14:
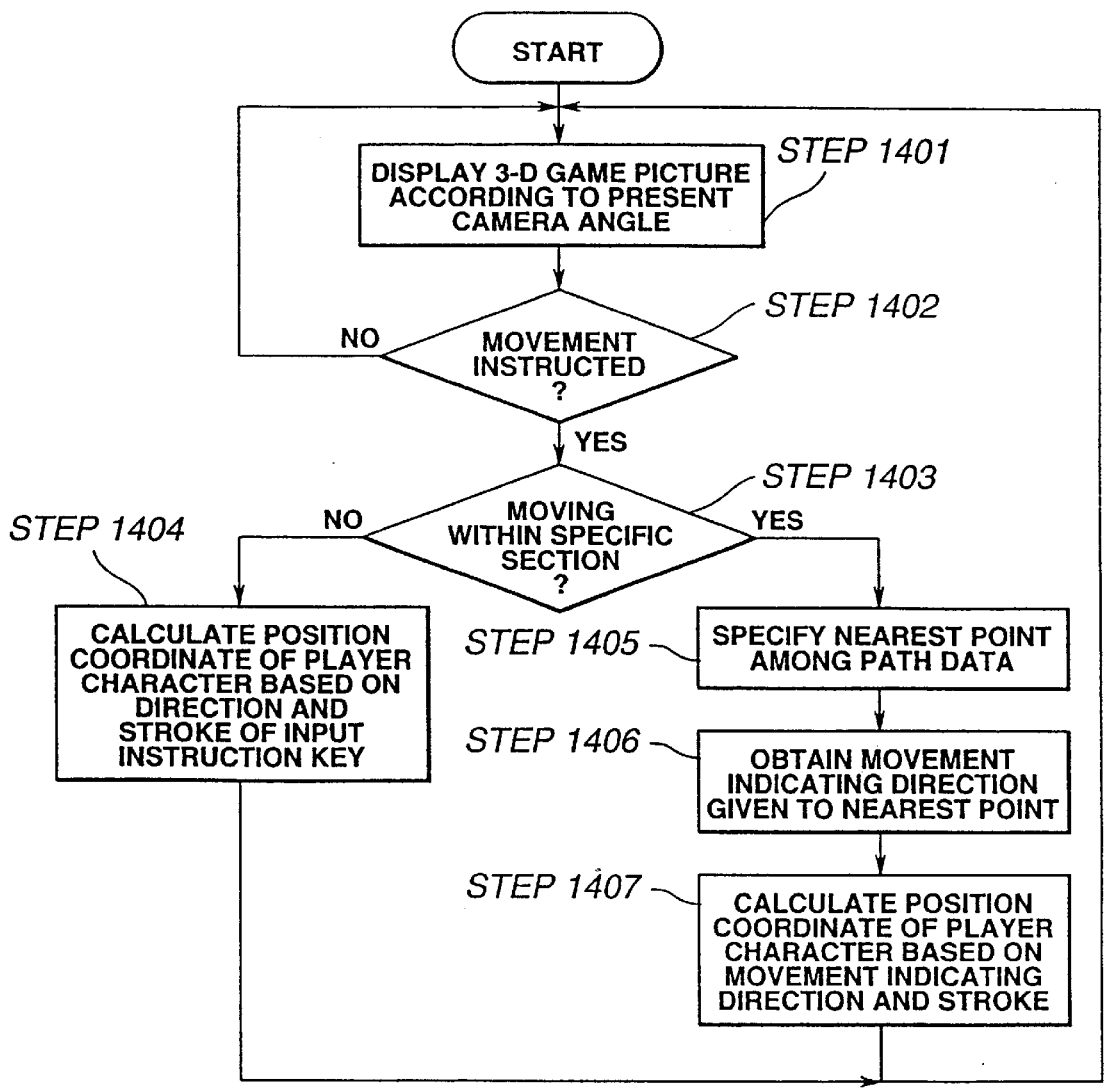
FIG. 14 is a flowchart for explaining the operation of the game machine of the second embodiment.

FIG. 14 is a flowchart for explaining the operation of the game machine of the present embodiment. In the figure, the game machine displays a 3-D game picture on the display unit 4 in accordance with the present camera angle in Step 1401. The player implements input manipulations (movement indicating manipulation) through the input unit 2 at hand while watching the game picture displayed on the display unit 4 in Step 1402. At this time, the area judging unit 1003 judges whether or not the player character is currently staying within the specific area in Step 1402. When it is judged that the player character is not in the specific area, the movement processing unit 1002 calculates the position coordinates of the player character based on the input direction from the direction detecting unit 911 and the stroke from the stroke detecting unit 912 in Step 1404. When it is judged that the player character is staying within the specific area on the other hand, the movement processing unit 1002 specifies the point (nearest point) closest to the player character among the path data in Step 1405 and obtains the movement instructing direction given to the nearest point in Step 1406. Then, the movement processing unit 1002 obtains the position coordinates of the player character based on the movement instructing direction and the stroke in Step 1407. Thereby, the current game picture is displayed on the display unit 4 in Step 1401.

Although the direction given to the point at the position nearest to the player character has been used as the movement instructing direction generated inside, the invention is not limited only to such a case.

Figure 12B:
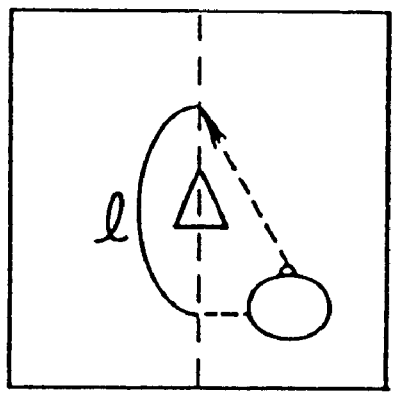

For instance, the movement instructing direction may be set by specifying the nearest point from the path information, by setting a point ahead of the nearest point by a predetermined length L as a target point and by setting the direction from the current position coordinate to the position coordinate of the target point as the movement instructing direction as shown in FIG. 12B.

Figure 12C:
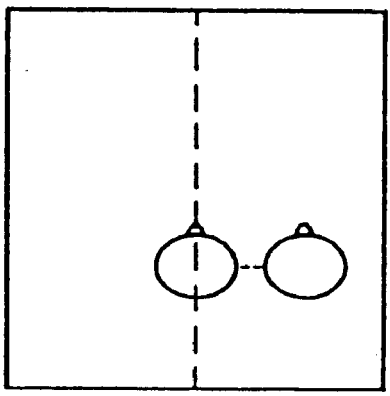

It is also possible to replace the position coordinate of the nearest point specified from the path information with the present position coordinate of the player character as shown in FIG. 12C.

As described above, the present embodiment allows the direction in which the player character is to move to be fixed even if the input direction with respect to the direction of line of sight changes within the specific area when the moving direction of the player character is decided by the input direction with respect to the direction of line of sight.

Accordingly, the input manipulation may be simplified as it is not necessary to change the input direction corresponding to the changes of the direction of line of sight. Thereby, the player can concentrate on the manipulation of the game and the original interest of the game is enhanced.

[Third Embodiment]

The present embodiment pertains to acquisition of information related to a game from a server via a network.

Figure 15:
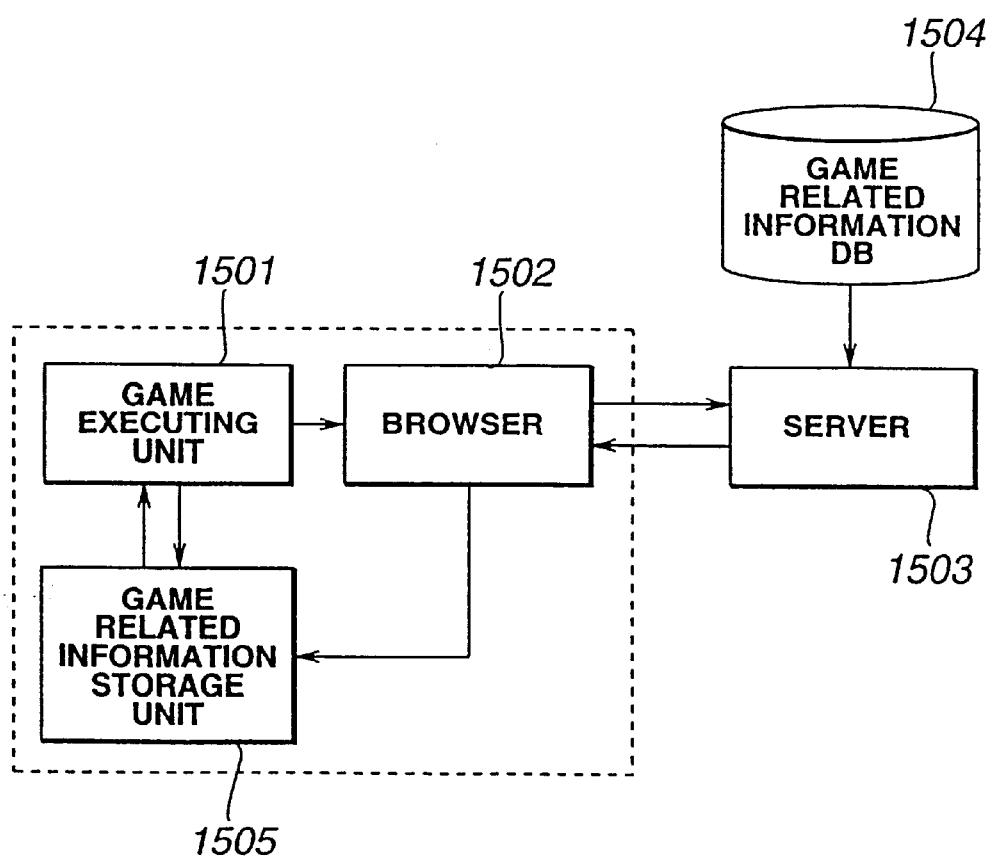
FIG. 15 is a block diagram showing the structure of a game system according to a third embodiment.

FIG. 15 is a functional block diagram showing the structure of a game system of the present embodiment. In the figure, a game executing unit 1501 executes a predetermined game program to provide the game to its player. A browser 1502 is connected to a server 1503 via a network by a communication unit 5 not shown to obtain game related information stored in a game related information DB 1504 according to a predetermined request for access (data transfer request). The browser 1502 stores the obtained game related information to a game related information storage unit 1505.

The browser 1502 may be started at the point of time when the power of the game machine is turned on or when the user specifies to do so. For instance, it is possible to arrange so as to start the browser when the player selects to connect with the network on a menu screen in starting the game or in accordance with the development (stage) of the story.

The game related information is information related to an object necessary for displaying the object on the game screen (image data, coordinate data, stage No. indicating the stage to be displayed, etc.) and information related to passwords necessary for advancing the story of the game and to items used in the story of the game. It may be information related to background music and sound effects of the game. When a game sound is obtained, it is set so as to sound when a special control is made for example.

The game related information storage unit 1505 is formed in the backup memory 106 shown in FIG. 1 for example and is read by the main memory 103 and the graphic memory 104 of the game machine 1 itself as necessary. It is noted that the backup memory 106 is connected to the game machine 1 via connecting means and is arranged to be removable so as to be able to exchange various data with another game machine 1.

Figure 16:
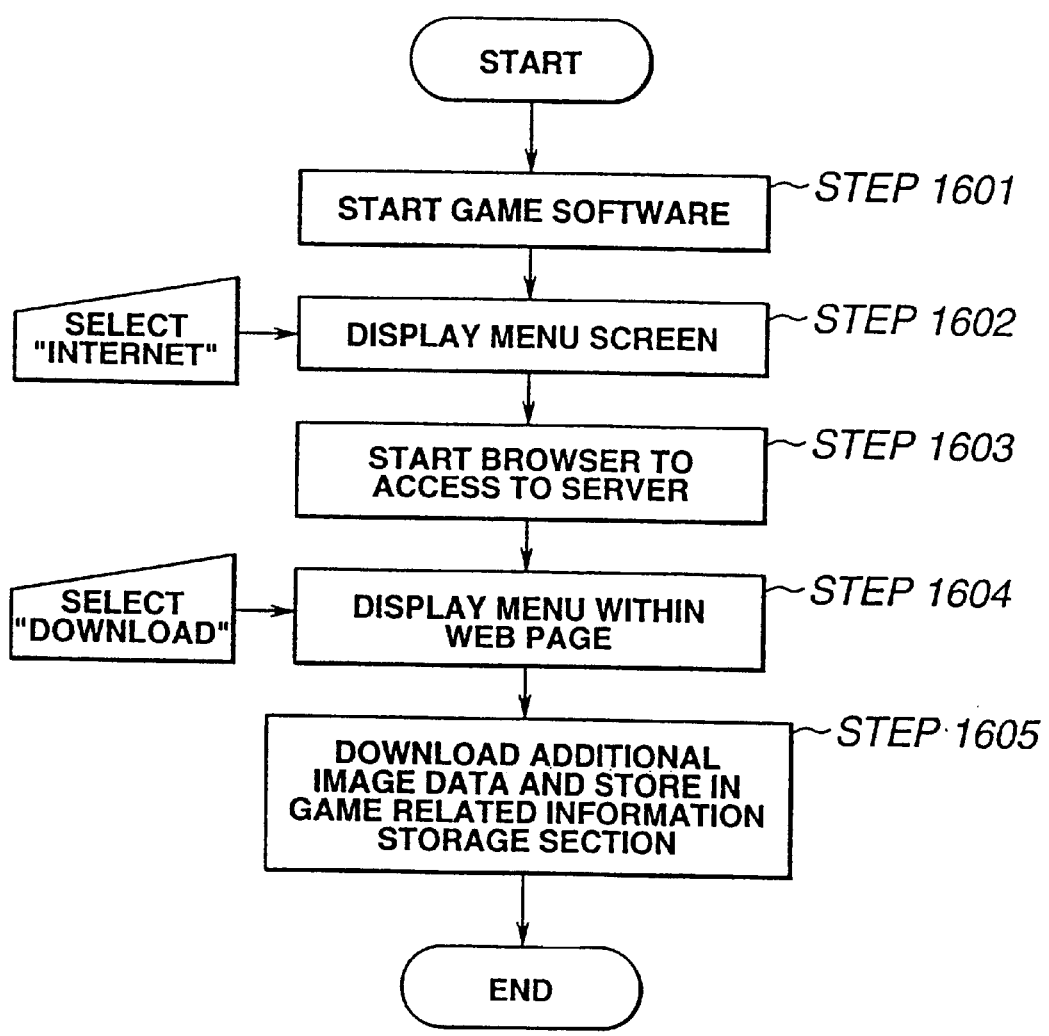
FIG. 16 is a flowchart for explaining a process for obtaining game related information by the game machine of the third embodiment.

FIG. 16 is a flowchart for explaining the process for obtaining game related information by the game machine of the present embodiment. As shown in the figure, when a game software is started as the player starts the manipulation in Step 1601, the game machine displays a menu screen in Step 1602. When the player selects "Internet" by using the controller pad or the like at hand, the game machine starts the browser 1502 to connect to the server 1503 in accordance with a predetermined network connecting script in Step 1603 to display a menu within a web page related to the game in Step 1604. When the player selects to download additional image data in accordance with the menu display of the displayed related home page, the browser 1502 starts to download the additional image data (object data) and stores it in the game related information storage unit 1505. Thereby, the game machine can obtain the game related information from the server 1503.

Figure 17:
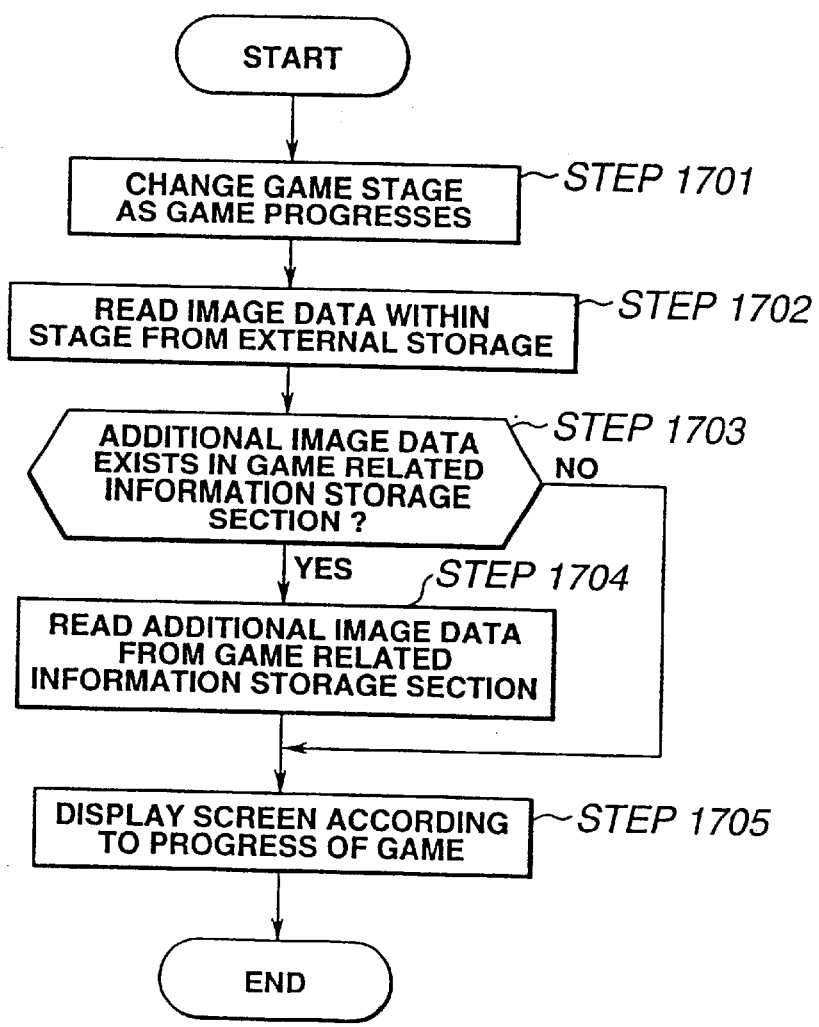
FIG. 17 is a flowchart for explaining the operational example using the game related information by the game machine of the third embodiment.

FIG. 17 is a flowchart for explaining the operational example using the game related information by the game machine of the present embodiment. As shown in the figure, the game machine reads stage data corresponding to the progress of the game to change stages of the game and to read image data related to the pertinent game stage from the external storage unit, e.g., the CD-ROM drive 3, in Step 1701. Next, the game machine judges whether or not the additional image data downloaded to the game related information storage unit 1505 exists in Step 1703. When it judges that the downloaded additional image data exists, it reads the additional image data (including image information of the character and coordinate information in the virtual 3-D space of the game) also from the game related information storage unit 1505 in Step 1704. Thereafter, the game machine composes a game screen of the image data/additional image data read in accordance with the progress of the game based on the coordinate information and displays it in step 1705. It is noted that the game machine composes the game screen so that the additional image data is displayed at the position specified by its coordinate data in priority over the normal image data.

Figure 18:
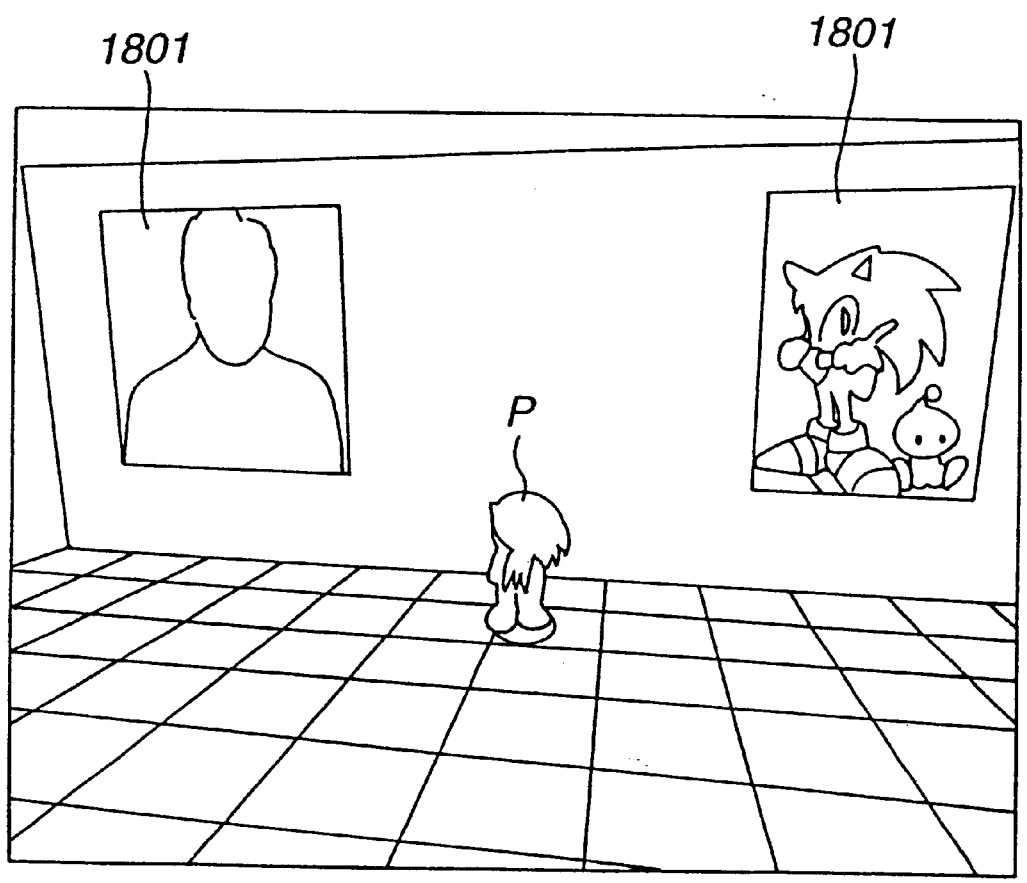
FIG. 18 shows one example of a game screen according to the third embodiment.

FIG. 18 shows one example of a game screen corrected by using the additional image data. As shown in the figure, a player character P is displayed within a virtual 3-D space rendering a stage of a game and additional image data 1801 is displayed at the position indicated by 3-D coordinate data within the virtual 3-D space for example. Thus, the additional image data downloaded from the server is displayed in the stage of the game appropriately.

As described above, the present embodiment allows the player of the game machine to obtain the game related information as necessary via the network and to use it within the game.

The present embodiment allows the game screen to be composed according to the image data obtained via the external storage unit or the network and to be presented to the player. Further, it allows the latest data obtained from the server to be presented to the player dynamically because the image data obtained from the server via the network is displayed in priority over others.

The following are examples of applying the game related information to games besides those described above.

(1) Displaying Signboard for Advertisement:

Object data may be displayed on the background of the game screen as a signboard for advertisement. Further, as a modification thereof, it is possible to construct a game in which signboards are installed within a stage of the game and players compete for the time on how fast player characters controlled by the players touch all of those signboards.

(2) Download textures of items used by a player character and others within the game.

(3) Change stages of a game by the types, numbers and others of downloaded game related information.

(4) Upload personal data of the player generated in the game to the server. Another player can exchange personal data among the players by downloading this data.

As described above, the invention can provide game pictures as if the virtual 3-D space is projected (taken) from the optimum virtual camera position corresponding to the situation of the game.

Further, even if the direction of line of sight changes by changing the camera angle variously corresponding to the situation of the game, the invention eliminates the need of changing the input direction according to that and allows the input manipulation to be simplified.

Still more, the invention allows the player of the game machine to obtain game related information from the server via the network to be utilized in the game.

While the preferred embodiments have been described, variations thereto will occur to those skilled in the art within the scope of the present inventive concepts which are delineated by the following claims.

What is claimed is:

1. A game machine composing a game screen based on game data and controlling the display of said composed game screen; said game machine comprising:

a reading interface for reading first game data from storage unit; and a communication device for obtaining second game data by communication with a server via a network;

wherein the game screen is composed based on said first game data;

wherein the game screen is composed in priority based on said second game data obtained via said communication device and wherein the second game data is obtained at a predetermined point of time, or at a user-designated point of time in the game.

2. The game machine according to claim 1, further comprising a storage device for storing the second game data obtained via said communication device.

3. The game machine according to claim 1, wherein said second game data includes at least object data and coordinate data and said game machine composes the game screen so that said object data is displayed in accordance with said coordinate data.

4. The game machine according to claim 1, wherein the game screen is at least partially replaced based on the second game data.

5. The game machine according to claim 1 or 2, wherein said a reading interface reads the first game data from a non-rewritable recording medium mounted in said storage unit.

6. The game machine according to claim 2, wherein said game machine further comprises a connecting device for removably connecting said storage device.

7. A game machine composing a game screen based on game data and controlling the display of said composed game screen, said game machine comprising:

a reading interface for reading first game data from a storage unit; and a communication device for obtaining second game data by communication with a server via a network;

wherein the game screen is composed based on said first game data;

wherein the game screen is modified such that said second game data obtained via said communication device replaces said first game data; and wherein the second game data is obtained at a predetermined point of time, or at a user-designated point of time in the game.

8. A game screen display controlling method comprising the steps of:

reading first game data from a storage unit; and obtaining second game data by communication with a server via a network;

composing the game screen based on said first game data;

composing the game screen in priority based on said second game data; and obtaining the second game data at a predetermined point of time, or at a user-designated point of time in the game.

9. The game screen display controlling method according to claim 8, further comprising the step of storing the second game data.

10. The game screen display controlling method according to claim 8, wherein said reading step includes the step of reading the first game data from a non-rewritable recording medium mounted in the storage unit.

11. The game screen display controlling method according to claim 8, further comprising the step of removably connecting the storage unit.

12. The game screen display controlling method according to claim 8, wherein the game screen is at least partially replaced based on the second game data.

13. A recording medium for recording a program which enables a game machine to realize control of display of a game screen, said program comprising:

reading means for reading first game data from a storage unit; and communication means for obtaining second game data by communication with a server via a network;

wherein the game screen is composed based on said first game data;

wherein the game screen is composed in priority based on said second game data obtained via said communication means; and wherein the second game data is obtained at a predetermined point of time, or at a user-designated point of time in the game.

14. A game screen display controlling method comprising the steps of:

reading first game data from a storage unit; and obtaining second game data by communication with a server via a network;

composing the game screen based on said first game data;

modifying the game screen such that said second game data replaces said first game data; and obtaining the second game data at a predetermined point of time, or at a user-designated point of time in the game.

15. A recording medium for recording a program which enables a game machine to realize control of display of a game screen, said program comprising:

reading means for reading first game data from a storage unit; and communicating means for obtaining second game data by communication with a server via a network;

wherein the game screen is composed based on said first game data;

wherein the game screen in modified such that said second game data obtained via said communication means replaces said first game data; and wherein the second game data is obtained at a predetermined point of time, or at a user-designated point of time in the game.

* * * * *